(12) United States Patent
Sawant et al.

(10) Patent No.: US 7,390,859 B2
(45) Date of Patent: Jun. 24, 2008

(54) COMPOSITIONS AND METHODS OF MAKING COMPOSITIONS EXHIBITING FUEL RESISTANCE

(75) Inventors: Suresh G. Sawant, Stevenson Ranch, CA (US); Chandra B. Rao, Valencia, CA (US); David R. Leon, Pasadena, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 383 days.

(21) Appl. No.: 11/053,102

(22) Filed: Feb. 8, 2005

(65) Prior Publication Data

US 2006/0175005 A1    Aug. 10, 2006

(51) Int. Cl.
*C08L 63/00* (2006.01)
*C08L 81/02* (2006.01)
*C08G 65/26* (2006.01)

(52) U.S. Cl. .................. 525/523; 525/524; 528/374; 528/376

(58) Field of Classification Search ............... None
See application file for complete search history.

(56) References Cited

U.S. PATENT DOCUMENTS

| | | | |
|---|---|---|---|
| 3,454,539 A * | 7/1969 | Greenlee | 528/360 |
| 4,366,307 A | 12/1982 | Singh et al. | |
| 4,609,762 A | 9/1986 | Morris et al. | |
| 5,225,472 A | 7/1993 | Cameron et al. | |
| 6,172,179 B1 | 1/2001 | Zook et al. | |
| 6,232,401 B1 | 5/2001 | Zook et al. | |
| 6,486,297 B2 | 11/2002 | Zook et al. | |
| 6,509,418 B1 | 1/2003 | Zook et al. | |
| 2004/0159511 A1 * | 8/2004 | Meroni et al. | 188/218 XL |
| 2004/0247792 A1 * | 12/2004 | Sawant et al. | 427/385.5 |
| 2005/0222369 A1 * | 10/2005 | Sue et al. | 528/86 |

FOREIGN PATENT DOCUMENTS

| | | | |
|---|---|---|---|
| GB | 2174994 A | * | 11/1986 |
| JP | 4-63302 A | * | 2/1992 |

OTHER PUBLICATIONS

"Sealing Compound, Polysulfide (T) Rubber, Fuel Resistant, Nonchromated Corrosion Inhibiting For Intermittent Use to 350 ° F. (182° C.)," *Aerospace Material Specification AMS 3265B*, SAE International, Jul. 2002, pp. 1-21.

* cited by examiner

*Primary Examiner*—Robert Sellers
(74) *Attorney, Agent, or Firm*—Diane R. Meyers

(57) ABSTRACT

Curable compositions comprising polythioether polymers and polybasic acid-based polyepoxies, and methods of using curable compositions comprising polythioether polymers and polybasic acid-based polyepoxies are disclosed. Cured, curable compositions exhibit enhanced corrosion resistance and adhesion upon exposure to fuels.

11 Claims, No Drawings

COMPOSITIONS AND METHODS OF MAKING COMPOSITIONS EXHIBITING FUEL RESISTANCE

This disclosure relates to curable compositions comprising polythioether polymers and polybasic acid-based polyepoxies, to methods of making curable compositions comprising polythioether polymers and polybasic acid-based polyepoxies, and to methods of using the curable compositions.

It can be useful that cured aviation and aerospace sealants exhibit a number of properties, including adhesion upon exposure to fuel, low temperature flexibility, high temperature resistance, and impart corrosion resistance to a surface to which the sealant is applied. Providing sealants with these and other properties can be particularly challenging in aviation and aerospace applications where the chemical, thermal, and physical stress conditions can be significant.

Adhesion of a sealant generally decreases upon exposure to fuels used in the aviation and aerospace industry. Compositions of the present disclosure comprising polythioether polymers and polybasic acid-based polyepoxies can maintain adhesion to a surface when exposed to aviation fuels, impart enhanced corrosion resistance to a surface to which the composition is applied, and/or meet other aviation and aerospace performance specifications. According to certain embodiments of the present disclosure, the adhesion and corrosion resistant properties of polythioether-based compositions exhibiting low temperature flexibility can be improved by curing polythioether polymers with polybasic acid-based polyepoxies.

In accordance with the usual meaning of "a" and "the" in patents, reference, for example, to "a" polythioether or "the" polythioether is inclusive of one or more polythioethers.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties to be obtained. In this application, the use of the singular includes the plural unless specifically stated otherwise. In this application, the use of "or" means "and/or" unless stated otherwise. Furthermore, the use of the term "including," as well as other forms, such as "includes" and "included," is not limiting.

A dash ("-") that is not between two letters or symbols is used to indicate a point of attachment for a substituent. For example, —COOH is attached through the carbon atom.

"Alkyl" refers to a saturated or unsaturated, branched, straight-chain or cyclic monovalent hydrocarbon group derived by the removal of one hydrogen atom from a single carbon atom of a parent alkane, alkene or alkyne. The term "alkyl" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double and triple carbon-carbon bonds. In certain embodiments, an alkyl group comprises from 1 to 12 carbon atoms. In other embodiments, an alkyl group comprises from 1 to 6 carbon atoms.

"Alkylene" refers to a saturated or unsaturated, branched, straight-chain or cyclic divalent hydrocarbon group derived by the removal of two hydrogen atoms from one or two carbon atoms of a parent alkane, alkene or alkyne. The term "alkylene" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double, and triple carbon-carbon bonds. In certain embodiments, an alkylene group comprises from 2 to 12 carbon atoms, and in certain embodiments, from 2 to 6 carbon atoms.

"Amine" refers to the radical —$NH_2$, and —NR'R" wherein R' and R" are independently selected from hydrogen, $C_{1-10}$ alkyl, and substituted $C_{1-10}$ alkyl, as defined herein.

"Cycloalkylene" refers to a saturated or unsaturated cyclic alkylene group. In certain embodiments, a cycloalkylene group can be $C_{3-12}$ cycloalkylene.

"Cycloalkylalkylene" refers to a divalent group derived by replacing one of the hydrogen atoms of a cycloalkyl group with an alkylene group, or derived by replacing two of the hydrogen atoms of a cyclic alkane, alkene, or alkynyl moiety with alkylene groups. In certain embodiments, a cycloalkylalkylene group can be $C_{4-24}$ cycloalkylalkylene, e.g., the alkylene moiety of a cycloalkylalkylene group can be a $C_{1-12}$ alkylene and the cycloalkylene moiety can be a $C_{3-12}$ cycloalkylene, or a $C_{5-24}$ cycloalkylalkylene can comprise a $C_{3-12}$ cycloalkylene group bonded to two $C_{1-6}$ alkylene groups.

"Hydroxyl" refers to the group —OH.

"Carboxyl" refers to the group —COO.

"Alkyleneoxy" refers to an alkylene group in which at least one of the —$CH_2$— groups is replaced with an oxygen atom, and more than one oxygen atoms are separated by at least one —$CH_2$— group. Thus, $C_3$ alkyleneoxy refers to a group chosen from —O—$CH_2$—$CH_2$—$CH_2$—, —$CH_2$—O—$CH_2$—$CH_2$—, —$CH_2$—$CH_2$—O—$CH_2$—, —$CH_2$—$CH_2$—$CH_2$—O—, —O—$CH_2$—O—$CH_2$—, —O—$CH_2$—$CH_2$—O—, —O—$CH_2$—$CH_2$—O—, and —$CH_2$—O—$CH_2$—O—.

"Cycloalkyleneoxy" refers to a cycloalkylene group in which at least one of the —$CH_2$— groups is replaced with an oxygen atom, and more than one oxygen atoms are separated by at least one —$CH_2$— group.

"Olefin" refers to acyclic and cyclic hydrocarbons having one or more carbon-carbon double bonds apart from the double bonds in an aromatic group. Olefins include alkenes, cycloalkenes, alkylenes, cycloalkylenes, and cycloalkylalkylenes.

"Electron attracting groups" refers to groups to which an electron can be transferred such as —COOR groups.

"Allyl" refers to the group —$CH_2$—CH=$CH_2$.

"Epoxy" refers to compounds in which an oxygen atom is directly attached to two adjacent carbon atoms of a carbon chain or ring system, and thus refers to a cyclic ether.

"Epoxide" refers to a subgenus of epoxy compounds containing a saturated three-membered cyclic ether. Examples of epoxides include 1,2-epoxypropane, and 2-methyloxirane.

"Vinyl" refers to the group —CH=$CH_2$.

The term "substituted", as used herein, means that any one or more hydrogens on the designated atom or group is replaced with a selection from the indicated group, provided that the designated atom's normal valence is not exceeded. When a substituent is oxo (i.e., =O) then two hydrogens on the atom are replaced. Combinations of substituents and/or variables are permissible only if such combinations result in stable compounds or useful synthetic intermediates. A stable compound or stable structure is meant to imply a compound that is sufficiently robust to survive isolation from a reaction mixture, and subsequent formulation as an agent having at least practical utility.

Curable compositions of the present disclosure comprise a polythioether polymer and a polybasic acid-based polyepoxy.

In certain embodiments, curable compositions of the present disclosure comprise polythioether polymers of Formula 1:

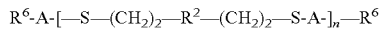

wherein

A is a segment chosen from Formula 2(a) and Formula 2(b):

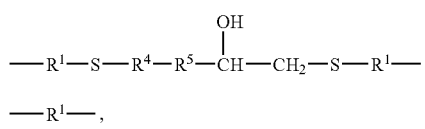

wherein
   each $R^1$ is independently chosen from $C_{2-6}$ n-alkylene, $C_{3-6}$ branched alkylene, $C_{6-8}$ cycloalkylene, $C_{6-10}$ alkylcycloalkylene, $—[—(CH_2)_p—X—]_q—(CH_2)_r—$, and $—[—(CH_2)_p—X—]_q—(CH_2)_r—$ in which at least one $—CH_2—$ group is substituted with at least one methyl group;
   wherein
      each X is independently chosen from O, S, $—NH—$, and $—NR^3—$, wherein each $R^3$ is independently chosen from hydrogen and $—CH_3$;
      p is an integer from 2 to 6;
      q is an integer from 1 to 5; and
      r is an integer from 2 to 10;
   each $R^2$ is independently chosen from O, $C_{2-6}$ alkyleneoxy, and $C_{5-12}$ cycloalkyleneoxy;
   each $R^4$ is independently chosen from $—CH_2—CH_2—$ an olefin conjugated with an electron attracting group;
   each $R^5$ is independently chosen from $C_{2-10}$ alkylene and $C_{2-10}$ alkyleneoxy;
   each $R^6$ is independently chosen from a thiol group, a hydroxyl group, an amine group, an allyl group, and a vinyl group; and
   n is an integer chosen to yield a number average molecular weight for the polythioether polymer ranging from 500 and 20,000 Daltons;
   wherein the weight ratio of the segment of Formula 2(a) to the segment of Formula 2(b) ranges from 2:1 to 3:1.

$R^1$ can be derived from compounds, monomers, and/or polymers having at least two thiol groups. In certain embodiments, polythiols include dithiols of Formula 4:

$$HS—R^1—SH \qquad 4$$

where $R^1$ can be a $C_{2-6}$ n-alkylene group, a $C_{3-6}$ branched alkylene group having one or more pendent groups which can be, for example, hydroxyl groups, and/or alkyl groups such as methyl or ethyl groups; $C_{2-6}$ alkyleneoxy group, a $C_{6-8}$ cycloalkylene group, a $C_{6-10}$ alkylcycloalkylene group; a $—[(—CH_2)_p—X—]_q—(—CH_2)_r—$ group, or a $—[(CH_2)_p—X—]_q—(—CH_2)_r—$ group in which at least one $—CH_2—$ unit is substituted with at least one methyl group; p is an integer ranging from 2 to 6; q is an integer ranging from 1 to 5; and r is an integer ranging from 2 to 10.

In certain embodiments, dithiols can comprise one or more heteroatom substituents in the carbon backbone, that is, dithiols in which X includes a heteroatom such as O, S, or other bivalent heteroatom radical; a secondary or tertiary amine group, such as $—NR^3—$, where $R^3$ is hydrogen or methyl; or a substituted trivalent heteroatom. In certain embodiments, X is O or S, and thus $R^1$ is $—[(—CH_2)_p—O—]_q—(—CH_2)_r—$ or $—[(CH_2)_p—S—]_q—(—CH_2)_r—$. In certain embodiments, p and r are equal. In certain embodiments, both p and r are 2.

In certain embodiments, a dithiol can be chosen from dimercaptodiethylsulfide (DMDS) (p=2, r=2, q=1, X=S), dimercaptodioxaoctane (DMDO) (p=2, q=2, r=1, X=O) or 1,5-dimercapto-3-oxapentane (p=2, r=2, q=1, X=O). In certain embodiments, a dithiol comprises heteroatom substituents in the carbon backbone and pendent alkyl groups, such as methyl pendent groups. Examples of dithiols comprising both heteroatom substituents in the carbon backbone, and pendent alkyl groups include, for example, methyl-substituted DMDS, such as $HS—CH_2CH(CH_3)—S—CH_2CH_2—SH$ and $HS—CH(CH_3)CH_2—S—CH_2CH_2—SH$, and dimethyl substituted DMDS such as $HS—CH_2CH(CH_3)—S—CH(CH_3)CH_2—SH$ and $HS—CH(CH_3)CH_2—S—CH_2CH(CH_3)—SH$.

In certain embodiments of compounds of Formula 1, R1 is a $C_{2-6}$ n-alkylene group, for example, 1,2-ethanedithiol, 1,3-propanedithiol, 1,4-butanedithiol, 1,5-pentanedithiol, or 1,6-hexanedithiol. In certain embodiments, $R^1$ is a $C_{3-6}$ branched alkylene group having one or more pendent groups, for example, 1,2-propanedithiol, 1,3-butanedithiol, 2,3-butanedithiol, 1,3-pentanedithiol, or 1,3-dithio-3-methylbutane. In certain embodiments, $R^1$ is a $C_{6-8}$ cycloalkylene or $C_{6-10}$ alkylcycloalkylene group, for example, dipentenedimercaptan, or ethylcyclohexyldithiol (ECHDT).

$R^2$ can be derived from polyvinyl ethers of Formula 5:

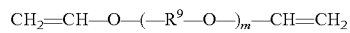

where $R^9$ can be chosen from a $C_{2-6}$ n-alkylene, $C_{2-6}$ branched alkylene, $C_{6-8}$ cycloalkylene, $C_{6-10}$ alkylcycloalkylene, or a $—[(CH_2)_p—O—]_q—(—CH_2)_r—$ group, m is a rational number from 0 to 10, p is an integer from 1 to 5, and r is an integer from 2 to 10. In certain embodiments, $R^9$ can be chosen from $C_{2-6}$ alkyleneoxy and $C_{5-12}$ cycloalkyleneoxy.

In certain embodiments, polyvinyl ethers can comprise an alkyleneoxy group, for example, from 1 to 4 alkyleneoxy groups, such as compounds in which m is an integer from 1 to 4. In certain embodiments, m is an integer from 2 to 4. In certain embodiments, polyvinyl ethers comprise polyvinyl ether mixtures. Such mixtures can be characterized by a non-integral average number of alkyleneoxy groups per molecule. Thus, in certain embodiments, m in Formula 5 can also be a rational number ranging from 0 to 10, in certain embodiments from 1 to 10, in certain embodiments from 1 to 4, and in certain embodiments from 2 to 4.

In certain embodiments, polyvinyl ethers can comprise divinyl ether monomers, such as divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, polytetrahydrofuryl divinyl ether, allyl acrylate, allyl methacrylate, or vinylcyclohexene; trivinyl ether monomers such as trimethylolpropane trivinyl ether or tetrafunctional vinyl ether monomers such as pentaerythritol tetravinyl ether. In certain embodiments, polyvinyl ether monomers can further comprise one or more pendent groups chosen from alkylene groups, hydroxyl groups, alkeneoxy groups, and amine groups.

In certain embodiments, polyvinyl ethers in which $R^9$ is a $C_{2-6}$ branched alkylene and can be prepared by reacting a polyhydroxy compound with acetylene. Examples of compounds of this type include compounds in which $R^9$ is an alkyl-substituted methylene group such as $—CH(CH_3)—$, for example, PLURIOL blends such as PLURIOL E-200 divinyl ether (commercially available from BASF Corp.) for which $R^9$ is ethylene and m is 3.8, or an alkyl-substituted ethylene, such as —$CH_2CH(CH_3)$—, for example, DPE polymeric blends including DPE-2 and DPE-3 (commercially available from International Specialty Products).

$R^4$ and $R^5$ can be derived from monoepoxies of Formula 6:

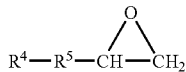
6 where $R^4$ can comprise a group, other than an epoxy group, that is reactive with a thiol group. In certain embodiments, $R^4$ can be derived from a —$CH_2$—$CH_2$— group or an olefin conjugated with an electron attracting group such as, for example, acrylates, methacrylates, acrylonitrile, and methacrylonitrile. In certain embodiments, $R^5$ can be chosen from a $C_{2-10}$ alkylene group, and a $C_{2-10}$ alkyleneoxy group. In certain embodiments, $R^5$ is —$CH_2$—O—$CH_2$—.

In certain embodiments, polythioether polymers useful in compositions of the present disclosure include polythioether polymers of Formula 3:

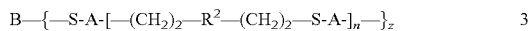   3 and in certain embodiments, of Formula 3(a):

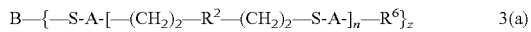   3(a)

wherein

A is a segment chosen from Formula 2(a) and Formula 2(b)

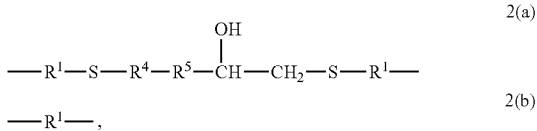

wherein
  each $R^1$ is independently chosen from $C_{2-6}$ n-alkylene, $C_{3-6}$ branched alkylene, $C_{6-8}$ cycloalkylene, $C_{6-10}$ alkylcycloalkylene, —[—$(CH_2)_p$—X—$]_q$—$(CH_2)_r$—, and —[—$(CH_2)_p$—X—$]_q$—$(CH_2)_r$— in which at least one —$CH_2$— group is substituted with at least one methyl group;
  wherein
    each X is independently chosen from O, S, —NH—, and —$NR^3$—, wherein each $R^3$ is independently chosen from hydrogen and —$CH_3$;
    p is an integer from 2 to 6;
    q is an integer from 1 to 5; and
    r is an integer from 2 to 10;
    each $R^4$ is independently chosen from —$CH_2$—$CH_2$—, and olefins conjugated with an electron attracting group, and
    each $R^5$ is independently chosen from $C_{2-10}$ alkylene and $C_{2-10}$ alkyleneoxy;
  each $R^2$ is independently chosen from O, $C_{2-6}$ alkyleneoxy, and $C_{5-12}$ cycloalkyleneoxy;
  each $R^6$ is independently chosen from a thiol group, a hydroxyl group, an amine group, and a vinyl group;

B is a z-valent group derived from a polyfunctionalizing agent;
  z is an integer from 3 to 6; and
  n is an integer chosen to yield a number average molecular weight for the polythioether polymer ranging from 500 to 20,000 Daltons;
  wherein the weight ratio of the segment of Formula 2(a) to the segment of Formula 2(b) ranges from about 2:1 to 3:1.

B is a z-valent group and can be derived from a compound, B', which represents a polyfunctionalizing agent. A polyfunctionalizing agent refers to a compound having more than two moieties that are reactive with —SH and/or —CH=$CH_2$ groups. In certain embodiments, a polyfunctionalizing agent can comprise from 3 to 6 such moieties, and B is denoted as a "z-valent" group, where z represents the number of such moieties included in the agent, and hence the number of separate branches comprising the polyfunctional polythioether polymer.

In certain embodiments of polythioethers of Formulae 3 and 3(a), the polyfunctionalizing agent is a trifunctionalizing agent wherein z is 3. In certain embodiments of polythioethers of Formulae 3 and 3(a), the functional groups of the polyfunctionalizing agent can be chosen from vinyl groups and thiol groups. Polyfunctionalizing agents having mixed functionality, i.e., polyfunctionalizing agents that include moieties, which can be different, that react with both thiol and vinyl groups can also be used. In certain embodiments, a polyfunctionalizing agent can comprise, for example, trimethylolpropane trivinylether, and the polythiols described in U.S. Pat. Nos. 4,366,307, 4,609,762, and 5,225,472. In certain embodiments, a trifunctionalizing agent can be chosen from triallylcyanurate (TAC) which is reactive with thiol groups, and 1,2,3-propanetrithiol, which is reactive with vinyl groups. In certain embodiments of polythioether polymers of Formulae 3 and 3(a), the polyfunctionalizing agent is derived from triallylisocyanurate, triallylcyanurate, and/or combinations thereof.

Mixtures of polyfunctionalizing agents comprising a range of functionalities can also be used in the preparation of polythioether polymers of Formulae 3 and 3(a). In certain embodiments, the use of certain amounts of trifunctionalizing agents can afford polythioether polymers having average functionalities from 2.05 to 3, and in certain embodiments, from 2.1 to 2.6. Other average functionalities can be achieved by using, for example, tetrafunctional polyfunctionalizing agents, or polyfunctionalizing agents with higher valencies or mixtures thereof. The average functionality of the resulting polythioether polymer can also be affected by factors such as stoichiometry of the reactants, as is known to those skilled in the art.

Polyfunctionalizing agents having more than three reactive moieties, i.e. z is greater than 3, afford star polymers and branched polymers. A star polymer comprises a single branch point from which predominately linear chains emanate. A branched polymer comprises a chain having a branch point intermediate between the boundary units from which predominately linear chains emanate. For example, two moles of TAC can be reacted with one mole of a dithiol to produce a polyfunctionalizing agent having an average functionality of 4. This polyfunctionalizing agent can then be reacted with a polyvinyl compound and a dithiol to yield a prepolymer, which in turn can then be reacted with a trifunctionalizing agent to afford a polythioether polymer blend having an average functionality ranging from 3 to 4.

Polythioethers used in compositions of the present disclosure can exhibit a number average molecular weight ranging from 500 to 20,000 Daltons, in certain embodiments, from 2,000 to 5,000 Daltons, and in certain embodiments, from 3,000 to 4,000 Daltons.

In certain embodiments, polythioether polymers of the present disclosure are liquid at a temperature of 20° C. (68° F.) or less. In certain embodiments, polythioether polymers of the invention are liquid at a temperature of 4° C. (40° F.) or less and in certain embodiments, are liquid at a temperature of 4° C. (40° F.) or less for at least one month. In certain embodiments, polythioether polymers of the present disclosure exhibit a viscosity ranging from 75 poise to 150 poise at a temperature of 20° C. and a viscosity ranging from 300 poise to 380 poise at a temperature of 4° C. In comparison, polythioether polymers formed using diepoxides such as disclosed in U.S. Pat. No. 6,486,297 exhibit a viscosity ranging from 400 poise to 450 poise at a temperature of 20° C. and are solid at a temperature of 4° C.

In certain embodiments, polythioether polymers of the present disclosure exhibit a viscosity of less than 200 poise at a temperature of 25° C. and a pressure of 760 mm Hg as determined according to ASTM D-2849 §79-90 using a Brookfield viscometer. In certain embodiments, polythioether polymers of the present disclosure exhibit a viscosity of 400 poise or less at a temperature of 4° C.

In certain embodiments, polythioether polymers of the present disclosure exhibit a glass transition temperature $T_g$ of −50° C. or less, in certain embodiments, −55° C. or less, and in certain embodiments, −60° C. or less. Low $T_g$ is indicative of good low temperature flexibility, which can be determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88. The glass transition temperature of polythioether polymers of the present disclosure can be measured by differential scanning calorimetry.

Methods of preparing polythioether polymers of Formula I are disclosed in U.S. Patent Application Publication No. US 2004/0247792 A1.

Polythioether polymers useful in curable compositions of the present disclosure of Formula 1 can be formed by the process of reacting a first polythiol with a compound comprising one epoxy group and a second group, other than an epoxy group, which is reactive with at thiol group to form a first prepolymer, wherein the a polythiol preferentially reacts with the second group; reacting the first prepolymer and a second polythiol with the epoxy group of the first polythiol to form a second prepolymer; and reacting the second prepolymer and a third polythiol with a polyvinyl ether. In certain embodiments, the second and third polythiols comprise un-reacted a first polythiol. In certain embodiments, the first polythiol, second polythiol, and third polythiol are the same polythiols.

In a first step, a polythiol can be reacted with a monoepoxy comprising one epoxy group and a second group, other than an epoxy group, that is reactive with a thiol group to form a first prepolymer. The reaction conditions are established such that the polythiol preferentially reacts with the second group, or the non-epoxy group, of the monoepoxy. In the first step, a thiol group can add across double bonds of the second, non-epoxy group, such as a vinyl group, to form the first prepolymer. The first prepolymer can be the 1:1 addition product of the polythiol and the monoepoxide, and comprises an epoxy group and a thiol group. Following the first reaction step, the reaction mixture comprises the first prepolymer and un-reacted polythiol.

In certain embodiments, a polythiol and monoepoxide can be reacted at a temperature of 70° C. for 1 hour. In certain embodiments, a polythiol can be present in an amount ranging from 40 to 80 mole percent, and in certain embodiments from 50 to 60 mole percent. In certain embodiments, a monoepoxide is present in an amount ranging from 5 to 25 mole percent, and in certain embodiments from 10 to 15 mole percent. Mole percent is based on total moles of reactants used in forming the polythioether polymer.

A polythiol can comprise any compound, polymer, or monomer having at least two thiol groups, and can include any of the polythiols disclosed herein. In certain embodiments, a polythiol can be a dithiol. In certain embodiments, a polythiol can comprise a mixture of polythiols. In certain embodiments, a polythiol can comprise dimercaptodioxaoctane and/or dimercaptodiethylsulfide.

In certain embodiments, a group that is reactive with a thiol group, other than an epoxy group, can be a vinyl group. In certain embodiments, the compound containing one epoxy group and a group that is reactive with a thiol group, other than an epoxy group, used in the preparation of polythioethers of Formula 1 can be allyl glycidyl ether. Other useful monoepoxides include, for example, glycidyl acrylate, and/or glycidyl methacrylate.

In a second reaction step, the first prepolymer and un-reacted polythiol remaining from the first reaction step can be reacted with the epoxy group of the first prepolymer, optionally in the presence of a catalyst, to form a second prepolymer. The second reaction step comprises the ring opening of the epoxy groups by un-reacted thiol groups. In the second reaction step, thiol groups on both the first prepolymer and un-reacted polythiols participate in the ring opening of the epoxy groups to form the second prepolymer. After the completion of the second reaction step, the reaction mixture comprises higher molecular weight polythiols as the second prepolymer, and un-reacted starting polythiols.

In certain embodiments, the optional catalyst comprises a basic catalyst such as, for example, triethylamine (TEA), 1,4-diazabicylco[2.2.2]octane (DABCO), 1,8-diazabicyclo [5.4.0]undec-7-ene (DBU), pyridine, and/or substituted pyridine. In certain embodiments, the second reaction step is carried out at a temperature ranging from 20° C. to 80° C. for 2 to 6 hours.

In a third reaction step, a polyvinyl compound can be reacted with the second prepolymer and un-reacted polythiol. The third reaction step comprises the free radical-catalyzed addition of thiol groups of both the second prepolymer and remaining un-reacted starting polythiol across the double bonds of a polyunsaturated compound such as a polyvinyl compound. In certain embodiments, a polyvinyl compound can be a polyvinyl ether, and in certain embodiments, can be a divinyl ether.

A polyvinyl ether can be any of the polyvinyl ethers disclosed herein. In certain embodiments, a polyvinyl ether used in the preparation of the polythioethers of Formula 1 can be diethylene glycol divinyl ether. In certain embodiments, the polyvinyl compound can be chosen from allyl acrylate, allyl methacrylate, and vinylcyclohexene. In certain embodiments, a polyvinyl ether can be present in an amount ranging from 5 to 25 mole percent, and in certain embodiments, from 10 to 20 mole percent, with the mole percent based on the total moles of reactants. The total amount of polyvinyl ether can be added to the reaction mixture at intervals during a 1 hour time period. After the addition reaction has proceeded to near completion, a free radical initiator such as VAZO 67 (2,2'-azobis(2-methylbutyronitrile) (commercially available from DuPont) in an amount ranging from 0.001% by weight to 0.10% by weight of the polyvinyl ether can be added to complete the reaction.

In certain embodiments, the catalyst used in the third reaction step can comprise a free-radical catalyst. In certain embodiments, the free-radical catalyst used in the preparation of polythioether polymers of Formula 1 can be chosen from azo(bis)isobutyronitrile (AIBN), and organic peroxides such as benzoyl peroxide, and t-butyl peroxide.

In certain embodiments, the third reaction step is carried out at a temperature ranging from 60° C. to 80° C. for 6 to 24 hours.

In certain embodiments, branched polythioether polymers of the present disclosure having the structure of Formulae 3 and 3(a) useful in compositions of the present disclosure can be formed by the process of reacting a first polythiol with a compound comprising one epoxy group and a second group, other than an epoxy group, which is reactive with at thiol group to form a first prepolymer, wherein the polythiol preferentially reacts with the second group, reacting the first prepolymer and a second polythiol with the epoxy group of the first prepolymer to form a second prepolymer, and reacting the second prepolymer and a third polythiol with a polyvinyl ether and a polyfunctionalizing agent. In certain embodiments, the second and third polythiols comprise unreacted first polythiol. In certain embodiments, the first polythiol, second polythiol, and third polythiol are the same polythiols.

To prepare branched polythioether polymers, a polyfunctionalizing agent is included in the third reaction step. The polyfunctionalizing agent can be any of those disclosed herein. In certain embodiments, the polyfunctionalizing agent can be trifunctional, and more specifically, the polyfunctionalizing agent is triallylcyanurate (TAC). In certain embodiments, the trifunctionalizing agent can be present in an amount ranging from 0.5 to 4 mole percent, and in certain embodiments, from 1 to 3 mole percent. Use of polyfunctionalizing agents produces a polythioether polymer having a functionality greater than 2. In certain embodiments, polythioether polymers formed by the processes disclosed herein have an average functionality ranging from 2.05 to 3, and in certain embodiments, ranging from 2 to 2.4.

Since the reaction of a polyvinyl compound with a polythiol is an addition reaction, the reaction can proceed substantially to completion, i.e. no or substantially no undesirable by-products are produced. For example, the process of forming polythioether polymers of the present disclosure does not produce appreciable amounts of malodorous cyclic by-products. Moreover, polythioether polymers prepared according to the processes of the present disclosure are typically substantially free of residual catalyst.

In certain embodiments, capped analogs of polythioether polymers of Formulae 1 and 3(a) can be prepared by further reacting a compound of Formula 7:

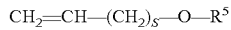   7

Compounds of Formula 7 are alkyl ω-alkenyl ethers having a terminal ethylenically unsaturated group that can react with terminal thiol groups to cap the polythioether polymer.

In Formula 7, s is an integer from 0 to 10, such as 0 to 6, or 0 to 4, and $R^5$ is an un-substituted or substituted alkylene group, such as a $C_{1-6}$ n-alkylene group which can be substituted with at least one —OH or —NHR$^7$ group, where $R^7$ is chosen from hydrogen and $C_{1-6}$alkylene. Examples of useful $R^5$ groups include alkylene groups, such as ethylene, propylene, and butylene; hydroxyl-substituted alkylene groups such as 4-hydroxybutylene; and, amine substituted groups such as 3-aminopropylene.

Compounds of Formula 7 where S is 0 are monovinyl ethers and include, for example, amino- and hydroxyalkylvinyl ethers, such as 3-aminopropyl vinyl ether and 4-hydroxybutyl vinyl ether (butanediol monovinyl ether), and unsubstituted alkyl vinyl ethers such as ethyl vinyl ether. Compounds of Formula 7 where S is 1 include allyl ethers, such as 4-aminobutyl allyl ether and 3-hydroxypropyl allyl ether.

Use of equivalent amounts of compounds of Formula 7 relative to thiol groups present in Formulae 1 and 3 provides fully capped polythioether polymers, while use of lesser amounts results in partially capped polythioether polymers.

Curable compositions of the present disclosure comprise a polybasic acid-based epoxy. Polybasic acid-based epoxies can be prepared by reacting a polybasic acid with an epoxy resin having at least two epoxy groups. Polybasic acids are generally viscous liquids produced by the oligomerization of saturated and/or unsaturated fatty acids. The carbon atoms of the constituent fatty acid chains can be linked together in a variety of ways to produce different structural types such as cyclic, monocyclic, bicyclic, and aromatic polybasic acids. Furthermore, within each type there can be many structural isomers. The distribution of the structural types and isomers can depend, for example, on the degree of the saturation of the starting fatty acid monomers and the process conditions employed for oligomerization. Examples of saturated fatty acids include hexadecanoic acid, octadecanoic acid, tetracosanoic acid, and the like. Examples of mono-unsaturated fatty acids include hexandecenoic acid, octadecenoic acid, and cis-tetracosenoic acid, and the like. Examples of polyunsaturated fatty acids include hexandecadienoic acid, octadecadienoic acid, and the like. A fatty acid monomer can be for example, a $C_{4-60}$ fatty acid, which can have any degree of saturation. In certain embodiments, polybasic acid-based epoxies of the present disclosure can be derived from a $C_{18}$ fatty acid.

Polybasic acids useful in polybasic acid-based epoxies of the present disclosure include monobasic acids, dibasic acids, also referred to herein as dimer acids, tribasic acids, and/or polybasic acids having higher functionality. Polybasic acids can be derived from one or more fatty acid monomers. For example, polybasic acids can be prepared by the oligomerization of a $C_{18}$ fatty acid and a $C_{22}$ fatty acid to produce a $C_{40}$ dibasic acid, or from two $C_{18}$ fatty acids to produce a $C_{36}$ dibasic acid. Polybasic acids useful for forming polybasic acid-based epoxies of the present disclosure can include mixtures of polybasic acids. In certain embodiments, useful polybasic acids are dibasic acids, also referred to as dimer acids. In certain embodiments, a dimer acid based polyepoxy can be derived from a $C_{1-60}$ fatty acid monomer, and in certain embodiments, from a $C_{20-40}$ fatty acid monomer. Dimer acids are commercially available from sources such as Cognis (EMPOL), Arizona Chemical (CENTURY, SYLVABLEND, and UNIDYME), and Uniquema (PRIPOL).

Polybasic acid-based epoxies can be prepared by reacting a polybasic acid with a polyepoxy. A polyepoxy incorporates two or more epoxy groups. Any appropriate polyepoxy can be used. In certain embodiments, the polyepoxy can have two epoxy groups, three epoxy groups, or more than three epoxy groups. The polyepoxy can comprise a single type of polyepoxy or a mixture of polyepoxies. In certain embodiments, the polyepoxy can comprise a polyepoxide, such as a diepoxide where an epoxide refers to a subgenus of epoxies containing a saturated, three-membered cyclic ether having the structure:

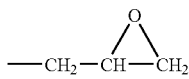

Examples of useful diepoxides include hydantoin diepoxide, diglycidyl ethers of bisphenol-A such as EPON 828 (commercially available from Resolution Performance Products, LLC), diglycidyl ethers of bisphenol-F, Novalak type epoxides such as DEN-431 (commercially available from Dow Plastics), and epoxidized unsaturated phenolic resins, acrylic polyol esters, methacrylic polyol esters, and triallylcyanurate. The stoichiometry of the acid groups of a polybasic acid and the epoxy groups of the epoxy can be selected to produce a polybasic acid-based epoxy having terminal epoxy groups capable of reacting with the terminal functional groups of a polythioether. For example, one mole of a polythioether of Formula 1 can be reacted with 2 moles of a diepoxide, and one mole of a trifunctional polythioether of Formula 3 can be reacted with 6 moles of a diepoxide. Any appropriate reaction method can be used to form a polybasic acid-based epoxy, for example, a polybasic acid-based epoxy can be produced by reacting a polybasic acid and a polyepoxy in the presence of a phenyl phosphine catalyst at a temperature ranging from 110° C. to 120° C. Examples of commercially available polybasic acid-based epoxies include HYPOX DA323 (Specialty Chemicals, Inc.), EPOTUF (Reichhold), and HELOXY (Resolution Performance Products).

Polybasic acid based epoxies comprise a hydrophobic backbone. Hydrophobicity of the backbone can impart enhanced adhesion and corrosion resistance to cured compositions comprising polybasic acid-based epoxies. The increased hydrophobicity can reduce the permeation of gases and/or moisture through the cured sealant and can reduce the mobility of ions at the interface between the sealant and the surface to which the sealant is applied. Both attributes can result in enhanced corrosion resistance. Therefore, in certain embodiments, useful polybasic acid-based epoxies can comprise a hydrophobic backbone. Examples of oligomers characterized by hydrophobic backbones include, for example, fatty acids, lipids, polyacrylates, alkylenes, alkyl-substituted ethyleneimines, alkyl acrylamides, styrenes, vinyl ethers, vinyl esters, and/or vinyl halides.

Curable compositions of the present disclosure can be useful as sealants and as such, can be formulated as polymerizable sealant compositions in applications where low temperature flexibility and fuel resistance are useful properties. Such applications include sealants for use in the aviation and aerospace industries and fuel tank linings.

Curable compositions of the present disclosure can comprise a polythioether and a polybasic acid-based epoxy. A polythioether can include a polythioether characterized by a single chemical formula, or multiple polythioethers characterized by more than one chemical formula. A polythioether having a certain chemical formula generally represents a distribution of polythioether polymers having a number average molecular weight wherein polythioethers within the distribution can reflect differences in the number of constituent repeat units and/or differences in the chemical composition of the constituent units. A polythioether as used herein is intended to represent a polythioether within the molecular weight distribution. Polythioethers useful in compositions of the present disclosure can exhibit a number average molecular weight ranging from 500 Daltons to 20,000 Daltons, in certain embodiments, from 2,000 Daltons to 5,000 Daltons, and in certain embodiments, from 3,000 Daltons to 4,000 Daltons. In certain embodiments, polythioethers useful in compositions of the present disclosure exhibit a polydispersity ($M_w/M_n$; weight average molecular weight/number average molecular weight) ranging from 1 to 20, and in certain embodiments, from 1 to 5. The molecular weight distribution of polythioethers can be characterized by gel permeation chromatography.

Curable compositions can comprise a polybasic acid-based epoxy. The polybasic acid-based epoxy can include a single polybasic acid-based epoxy or a mixture of polybasic acid-based epoxies.

The polythioether and the flexible epoxy are reacted in stoichiometric ratio of thiol groups to epoxy groups ranging from 0.1 to 5, and in certain embodiments, from 0.9 to 1.2. In certain embodiments, the equivalent weight of epoxide groups in the reaction mixture is 500.

A polythioether can be present in a curable composition in an amount ranging from 30% by weight to 90% by weight of the curable composition, in certain embodiments, from 40% by weight to 80% by weight, and in certain embodiments, from 45% by weight to 75% by weight, based on the total solids weight of the composition.

In certain embodiments, curable compositions of the present disclosure can further comprise materials known in the art of formulating sealant compositions, and particularly sealant compositions used in the aviation and aerospace and fuel tank industries, including, fillers, adhesion promoters, pigments, plasticizers, wetting agents, surfactants, flow control agents, catalysts, agents for controlling and/or modifying rheological properties, thixotropic agents, mildewcides, fungicides, anti-oxidants, ultraviolet light absorbers, fire retardants, masking agents, solvents, polymeric microparticles, electrically and/or thermally conductive materials, and/or anti-corrosion agents. In certain embodiments, these and/or other materials can be present in a curable composition of the present disclosure in an amount ranging from 0% by weight to 60% by weight of the total weight of the curable composition, and in certain embodiments, ranging from 0% by weight to 40% by weight.

Curable compositions of the present disclosure can include a filler. Fillers can be added to curable compositions of the present disclosure to impart desirable physical properties such as, for example, increased the impact strength, controlled viscosity, modified the electrical properties, and/or reduced specific gravity of the curable composition. Fillers useful in curable compositions of the present disclosure include those known in the art of formulating sealants, such as carbon black, calcium carbonate, silica, polymer powders, talc, and/or hydrophobic fumed silica. Examples of fillers include SIPERNAT D-13 hydrophobic precipitated silica (commercially available from Degussa), WINNOFIL SPM precipitated calcium carbonate (commercially available from Solvay Chemicals), TS-270 (commercially available from Cabot Corporation), titanium dioxide (commercially available from DuPont), aluminum hydroxide, and/or ORGOSOL 1002 D Nat 1 ultrafine polyamide powder (commercially available from Atofina Chemicals). In certain embodiments, curable compositions comprise an amount of filler ranging from 5% by weight to 60% by weight of the total solids weight of the curable composition, and in certain embodiments form 10% by weight to 50% by weight.

In certain embodiments, curable compositions of the present disclosure can comprise a pigment. Examples of useful pigments include carbon black, metal oxides, and/or calcium carbonate. Pigment grade carbon black can be characterized by low structure and particle size such as REGAL 660R (commercially available from Cabot Corporation). BRILLIANT 1500 is an example of pigment grade, 99.995+ %, calcium carbonate (commercially available from Aldrich Chemical). In certain embodiments, a curable composition comprises an amount of pigment ranging from 0.1% by weight to 10% by weight, and in certain embodiments, from 0.1% by weight to 5% by weight of the total solids weight of the curable composition.

In certain embodiments, curable compositions of the present disclosure can comprise an accelerator and/or catalyst. Examples of cure accelerators include triethylamine (TEA), 1,8-diazabicyclo[5.4.0]undec-7-ene (DBU), 2,4,6-tris(dimethylaminomethyl)phenol (DMP-30) (commercially available from Rohm and Haas), 1,1,3,3-tetramethylguanidine (TMG), carbamate paste (commercially available from PRC-DeSoto International), and/or 1,4-diazabicyclo[2.2.2]octane (DABCO) (commercially available from Air Products). In certain embodiments that contain silanes, the catalyst can be, for example, titanate TBT (commercially available from DuPont). In certain embodiments, a curable composition can comprise an amount of cure accelerator ranging from 0.1% by weight to 5% by weight of the total solids weight of the curable composition.

In certain embodiments, curable compositions of the present disclosure can comprise an adhesion promoter and/or coupling agent. Adhesion promoters and/or coupling agents enhance adhesion of the polythioether polymer and/or other polymeric components of the curable composition to particulate additives as well as to substrate surfaces. Examples of adhesion promoters include phenolics such as METHYLON 75108 phenolic resin (commercially available from Occidental Chemical Corp.) and/or organosilanes comprising epoxy, mercapto or amino functionalities such as SILQUEST A-187 (8-glycidoxypropyl trimethoxysilane) and SILQUEST A-1100 (8-aminopropyl-trimethoxysilane) (commercially available from OSi Specialties). Other useful adhesion promoters include organic titanates such as, for example, TYZOR tetra n-butyl titanate (TBT) (commercially available from Dupont), hydrolyzed silane (commercially available from PRC-DeSoto International), and/or phenolic cook (commercially available from PRC-DeSoto International). In certain embodiments, a curable composition can comprise an amount of adhesion promoter ranging from 0.1% by weight to 15% by weight, and in certain embodiments, from 0.1% by weight to 5% by weight of the total solids weight of the composition.

In certain embodiments, curable compositions of the present disclosure can comprise a thixotropic agent. A thixotropic agent can stabilize the viscosity of a curable composition in response to sheer stress. In certain embodiments, a thixotropic agent can include fumed silica, and/or carbon black. In certain embodiments, a curable composition can comprise an amount of thixotropic agent ranging from 0.1% by weight to 5% by weight of the total solids weight of the curable composition.

In certain embodiments, curable compositions of the present disclosure can comprise a retardant. A fire retardant can reduce the combustibility and/or flame propagation of a cured composition. In certain embodiments, a curable composition can comprise an amount of fire retardant ranging from 0.1% by weight to 5% by weight of the total solids weight of the curable composition.

In certain embodiments, curable compositions of the present disclosure can comprise a masking agent, such as pine fragrance or other scent, which can be useful in covering any undesirable low-level odor of the curable composition. In certain embodiments, a curable composition can comprise an amount of masking agent ranging from 0.1% by weight to 1% by weight of the total solids weight of the curable composition.

Curable compositions of the present disclosure can further comprise a solvent. A solvent can be an aqueous solvent, and/or organic solvent. An organic solvent can be included to reduce the viscosity of the uncured curable composition to facilitate handling and/or application. An organic solvent can be volatile such that it rapidly evaporates following application of a curable composition to a surface. In certain embodiments, prior to a curing, a curable composition can comprise an amount of an organic solvent ranging from 0% by weight to 15% by weight, and in certain embodiments, from 10% by weight to 15% by weight of the total solids weight of the curable composition. Examples of useful organic solvents include aliphatic solvents, aromatic and/or alkylated aromatic solvents such as toluene, xylene, and SOLVESSO 100 (commercially available from ExxonMobil Chemical), alcohols such as isopropanol, acetates such as methoxy propanol acetate, butyl acetate, and isobutyl acetate, esters, ketones, glycol ethers, and/or glycyl ether esters. In certain embodiments, uncured coating compositions of the present disclosure can comprise an amount of solvent ranging from 25% by weight to 70% by weight, and in certain embodiments, from 35% by weight to 55% by weight, based on the total weight of the uncured coating composition. In certain embodiments, coating compositions of the present disclosure can have a low level of Volatile Organic Compounds ("VOC"). VOC refers to the amount of organic solvent in a solution and/or dispersion comprising forming a coating composition. For example, in certain embodiments, a coating composition can have a VOC less than 700 g/L, and in certain embodiments, less than 600 g/L.

In certain embodiments, coating compositions of the present disclosure can comprise an amount of rheology modifiers, thixotropic agents and/or flow control agents ranging from 0% by weight to 5% by weight, and in certain embodiments, ranging from 0% by weight to 2% by weight, of the total solids weight of the curable composition. Examples of suitable rheology modifiers and thixotropic agents include clays, polyamides, salts of unsaturated polyamine amides, fumed silica, amorphous silica, and/or xanthan gum.

In certain embodiments, curable compositions of the present disclosure can comprise an amount of wetting agent and/or surfactant ranging from 0% by weight to 5% by weight, and in certain embodiments, from 1% by weight to 3% by weight, of the total solids weight of the curable composition. Examples of suitable wetting agents and/or surfactants include low molecular weight unsaturated polycarboxylic acids, fluorinated compounds, and/or sulfonyls.

In certain embodiments, coating compositions of the present disclosure can comprise an amount of UV stabilizer ranging from 0% by weight to 0.1% by weight, and in certain embodiments, from 0% by weight to 0.02% by weight, of the total solids weight of the coating composition.

Coating compositions of the present disclosure can comprise a dye and/or pigments to provide color. In certain embodiments, uncured coating compositions of the present disclosure can comprise an amount of dye and/or pigment ranging from 0% by weight to 1% by weight, and in certain embodiments, from 0% by weight to 0.5% by weight, of the total solids weight of the curable composition. Examples of dyes and/or pigments include titanium dioxide, metallic pigments, inorganic pigments, talc, mica, iron oxides, lead oxides, chromium oxides, lead chromate, carbon black, electrically conductive pigments such as conductive carbon black and carbon fibrils, and/or nanomaterials.

Plasticizers that are useful in polymerizable compositions of the present disclosure include phthalate esters, chlorinated paraffins, hydrogenated terphenyls, and/or partially hydrogenated terphenyls. A curable composition can comprises an amount of plasticizer ranging from 1% by weight to 40% by weight, and in certain embodiments, from 1% by weight to 10% by weight of the total solids weight of the curable composition.

In certain embodiments, curable compositions can comprise a corrosion inhibitor. A corrosion inhibitor can reduce, for example, galvanic corrosion of dissimilar metal surfaces. In certain embodiments, corrosion inhibitors include strontium chromate, calcium chromate, and/or magnesium chromate. Aromatic triazoles can also be used to inhibit corrosion of aluminum and steel surfaces. In certain embodiments, a sacrificial oxygen scavenger such as Zn can be used as a corrosion inhibitor. In certain embodiments, a curable composition can comprise an amount of corrosion inhibitor of 10% by weight or less of the total solids weight of the curable composition.

Curable compositions of the present disclosure can be advantageously used as sealants, and in particular, as sealants where low temperature flexibility and resistance to fuel are desirable attributes. For example, curable compositions can be used as aviation and aerospace sealants. The term "sealant," "sealing," or "seal" as used herein refers to curable compositions that have the ability when cured to resist atmospheric conditions such as moisture and temperature and at least partially block the transmission of materials such as water, water vapor, fuel, and/or other liquids and gasses.

Curable compositions of the present disclosure can be prepared by combining a first component comprising a polythioether, also referred to herein as a base component, and a second component comprising a polybasic acid-based polyepoxy, also referred to herein as an accelerator component. The first and second components can be combined in a desired ratio using, for example, meter mix equipment fitted with a dynamic mix head. Pressure from the meter mix equipment can force the first and second components through the dynamic mix head and an extrusion die. The first and second components can be combined immediately prior to application to a surface to be sealed.

Curable compositions of the present disclosure can be useful as sealants for sealing metal surfaces, such as Mil-C and/or AMS surfaces including stainless steel, aluminum, and/or Alcalad surfaces.

In certain embodiments, a surface to be sealed can be treated prior to application of a curable composition by any method capable of removing particulates and/or surface films. For example, in certain embodiments, a surface can be solvent wiped using a lint free fabric retaining a volatile solvent such as ethanol, methanol, naptha, mineral spirits, methyl isobutyl ketone, methyl ethyl ketone, acetone, and/or other suitable solvents. In certain embodiments, a commercially available cleaning solvent such as DESOCLEAN 120 (commercially available from PRC-DeSoto International, Inc.) can be used.

Curable compositions of the present disclosure can be applied to a surface by any means known to those skilled in the art and as appropriate for a particular application including extruding, pressing, grouting, caulking, spreading, and the like.

Curable compositions of the present disclosure can be cured according to recommended procedures as can be determined by one skilled in the art and, in certain embodiments, at ambient temperature. In certain embodiments, curable compositions are curable at a minimum temperature of 0° C., in certain embodiments, at a minimum temperature of −10° C., and in certain embodiments at a minimum temperature of −20° C. By curable is meant capable of undergoing one or more chemical reactions to form stable, covalent bonds among at least some of the constituent compounds of the curable composition, for example, between a polythioether and a polybasic acid-based epoxy. For example, for a curable composition comprising a polythioether and a polybasic acid-based polyepoxy, during the curing process the reactive groups of a polythioether will react with the epoxy groups to form covalent bonds.

The integrity, moisture resistance, and fuel resistance of the seal resulting from application of curable compositions of the present disclosure can be evaluated by performing, for example, the tests identified in specification AMS 3265B. An acceptable seal will be tight and resistant to moisture and aircraft fuel.

When cured, curable compositions of the present disclosure exhibit properties advantageous for use in sealants when exposure to fuel is anticipated, such as, for example, in certain aviation and aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that when cured, curable compositions of the present disclosure used in aviation and aircraft applications exhibit a percent volume swell not greater than 25% following immersion for one week at 60° C. (140° F.) and ambient pressure in JRF type 1. Other properties, ranges, and/or thresholds may be appropriate for other sealant applications.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

When cured, curable compositions of the present disclosure exhibit fuel resistance. A measure of fuel resistance is the percent volume swell following prolonged exposure of a cured composition of the present disclosure to a hydrocarbon fuel, which can be quantitatively determined using methods similar to those described in ASTM D792, AMS 3269, or AMS 3265B. Thus, in certain embodiments, when cured, curable compositions of the present disclosure exhibit a percent volume swell of 25% or less following immersion for one week at 60° C. (140° F.) and ambient pressure in jet reference fluid (JRF) type 1, and in certain embodiments, a percent volume swell of 20% or less. In certain embodiments, the percent volume swell of the cured, curable compositions is 20% or less. JRF type 1, as employed herein for determination of fuel resistance, has the following composition (see AMS 2629, issued Jul. 1, 1989), section 3.1.1 et seq., available from SAE (Society of Automotive Engineers, Warrendale, Pa.): 28±1% by volume toluene, 34±1% by volume cyclohexane, 38±1% by volume isooctane, 1±0.005% by volume tertiary dibutyl disulfide, and 0.015%±0.0015 by weight of the other four components including tertiary butyl mercaptan.

Depending on a particular formulation, curable compositions of the present disclosure can exhibit initial extrusion rates as high as 500 g/min or higher, together with low extrusion rates ranging from 5 g/min to 10 g/min or less one hour following mixing.

Curable compositions of the present disclosure can exhibit a $T_g$ when cured of −55° C. or less, in certain embodiments, −60° C. or less, and in certain embodiments −65° C. or less. The glass transition temperature, $T_g$, can be measured by differential scanning calorimetry.

In certain embodiments, curable compositions of the present disclosure exhibit a peel strength greater than 20 pounds per square inch as determined according to AMS 3265B. In certain embodiments, curable compositions of the present disclosure exhibit enhanced corrosion resistance compared to curable compositions formulated without polybasic acid-based epoxies. Corrosion resistance can be determined, for example, by the appropriate test methods specified in AMS 3265B.

EXAMPLES

Embodiments of the present disclosure can be further defined by reference to the following examples, which describe in detail preparation of compositions of the present disclosure and properties of compositions of the present disclosure. It will be apparent to those skilled in the art that many modifications, both to materials and methods, may be practiced without departing from the scope of the present disclosure.

In the examples below, the following abbreviations have the following meanings. If an abbreviation is not defined, it has its generally accepted meaning.

| | |
|---|---|
| AGE = | allyl glycidyl ether |
| AMS = | Aerospace Material Specifications |
| ASTM = | American Society for Testing and Materials |
| BSS = | Boeing Specification Support Standard |
| % CF = | percent cohesive failure |
| DABCO = | 1,4-diazabicyclo[2.2.2]octane |
| DBU = | 1,8-diazabicyclo[5.4.0]undec-7-ene |
| DEG-DVE = | diethylene glycol divinyl ether |
| DMDO = | dimercaptodioxaoctane |
| DMDS = | dimercaptodiethylsulfide |
| g = | gram |
| epoxy/HS = | epoxy/mercaptan ratio |
| JRF = | jet reference fuel |
| ml = | milliliter |
| Mil-C = | Military Specification C |
| mm Hg = | millimeters of mercury |
| pli = | pounds per linear inch (kg/cm) |
| psi = | pounds per square inch |
| TAC = | triallylcyanurate |

Adhesion Tests

Peel strength was measured according to AMS 3265.

Skydrol Solvent Resistance Test

The Skydrol Solvent Resistance Test was performed by immersing a test panel having a coating system in Skydrol jet aviation fuel for a minimum of 30 days at 70° C. The test panel having a coating system is removed, and dried. The pencil hardness of the coating system is then measured. A coating system passes the Skydrol Solvent Resistance Test when the pencil hardness is at least "H".

Example 1

Base Composition

A 5 liter 4-neck flask was charged with 2,356.4 g (12.83 moles) of DMDO followed by 403.56 g (3.5 moles) of AGE while stirring. The mixture was heated at 70° C. for 1 hour. Triethylamine (0.69 g, 0.0068 mole) was added and the mixture was heated at 70° C. for 3.5 hours. A solution of 116.35 g (0.46 mole) of TAC and 1,147.28 g (7.25 moles) of DEG-DVE was added over 2.5 hours at 70° C. The mixture was stirred at 70° C. for an additional 1 hour. Nine portions of VAZO 67 (0.33 g, 0.008% of total charge) were added at one-hour intervals at a temperature of 70° C., to complete the reaction. The mixture was degassed at 70° C./0.5 mm Hg for 2 hours to provide a liquid polythioether, Polymer 1, of faint yellow color and low odor, exhibiting a viscosity of 160 poise at room temperature. The yield was 4.023 Kg (100%). The polythioether polymer remained liquid for at least 365 days at a temperature of 4° C. (39° F.).

Polythioether Polymer 1 was formulated into a base, Base 1. The composition of the base comprising polythioether Polymer 1 is provided in Table 1.

TABLE 1

Composition of Base 1.

| Base Component | Amount (g) |
|---|---|
| Polythioether Polymer 1 | 100 |
| Phenolic Resin | 1.5 |
| Phenolic Adhesion Promoter | 1 |
| Titanate TBT | 0.5 |
| DABCO Catalyst | 0.8 |
| Tung Oil | 0.5 |
| A1100 Silane Adhesion Promoter | 2 |
| Silica | 0.4 |
| Titanium Dioxide | 1 |
| SIPERNAT D-13 | 1.5 |
| Aluminum Hydroxide | 15 |
| Calcium Carbonate | 55 |

An accelerator composition comprising a dimer acid-based polyepoxy was prepared as provided in Table 2.

TABLE 2

Composition of Accelerator A.

| Accelerator Component | Amount (g) |
|---|---|
| Dimer Acid Epoxy | 100 |
| Hydrogenated Terphenyl | 24 |
| Calcium Carbonate | 90 |
| Carbon Black | 0.5 |

TABLE 2-continued

Composition of Accelerator A.

| Accelerator Component | Amount (g) |
|---|---|
| Carbamate Paste | 0.4 |
| Hydrolyzed Silane | 5.3 |

Base 1 and Accelerator A were combined with different epoxy/mercaptan ratios, applied to a Mil-C surface, and cured.

The peel strength of the cured sealants were evaluated both dry and following immersion in JRF Type 1 for 7 days at 60° C. (140° F.). The results are provided in Table 3.

TABLE 3

Peel Strength of Curable Compositions of Base 1 and Accelerator A.

| Epoxy/HS Ratio | Peel (Dry) (pli/% cohesive failure) | Peel (JRF Type 1) (pli/% cohesive failure) |
|---|---|---|
| 1.00 | 42/100% CF | 36/100% CF |
| 1.05 | 43/100% CF | 36/100% CF |
| 1.10 | 47/100% CF | 33/100% CF |
| 1.15 | 33/100% CF | 27/100% CF |
| 1.20 | 33/100% CF | 30/100% CF |

Example 2

Comparative Example

Base Composition

A 1 liter 4-neck flask was charged with 284.07 g (1.56 moles) of DMDO and 60.13 g (0.38 mole) of DMDS followed by 43.82 g (0.38 mole) of AGE while stirring. The mixture was stirred for 40 minutes. Triethylamine (0.18 g, 0.0018 mole) was added and the mixture was heated at 70° C. for 2 hours. A solution of 9.48 g (0.038 mole) of TAC, and 204.94 g (1.30 mole) of DEG-DVE was then added over 30 minutes at 70° C. The mixture was then stirred at 70° C. for an additional 30 minutes. Seven portions of free radical initiator VAZO 67 (2,2'-azobis(2-methylbutyronitrile) (commercially available from DuPont) (0.145 g, 0.024% of total charge) were added at one-hour intervals while the temperature of the reaction mixture was maintained at 70° C., to complete the reaction. The reaction mixture was then degassed at 70° C./0.5 mm Hg for 2 hours to provide a liquid polythioether, Polymer 2, of faint yellow color and low odor, exhibiting a viscosity of 92 poise at room temperature. The reaction yield was 602 g (100%). The polythioether polymer remained liquid for 56 days at a temperature of 4° C. (39° F.).

The polythioether, Polymer 2, was formulated into a base, Base 2. The composition of Base 2 comprising polythioether Polymer 2 is provided in Table 4.

TABLE 4

Composition of Base 2.

| Base Component | Amount (g) |
|---|---|
| Polythioether Polymer 2 | 100 |
| Phenolic Resin | 1.5 |
| Phenolic Adhesion Promoter | 1 |
| Titanate TBT | 0.5 |

TABLE 4-continued

Composition of Base 2.

| Base Component | Amount (g) |
|---|---|
| DABCO Catalyst | 0.8 |
| Tung Oil | 0.5 |
| A1100 Silane Adhesion Promoter | 2 |
| Silica | 0.4 |
| Titanium Dioxide | 1 |
| SIPERNAT D-13 | 1.5 |
| Aluminum Hydroxide | 15 |
| Calcium Carbonate | 55 |

Accelerator Compositions

The compositions of the accelerators used to form sealants using Base 2 are presented in Table 5.

TABLE 5

Composition of Accelerators 1, 2, and 3.

| Component | Accelerator 1 | Accelerator 2 | Accelerator 3 |
|---|---|---|---|
| Epon 828 | 50 | 0 | 40 |
| DEN-431 | 50 | 100 | 60 |
| Hydrogenated Terphenyl | 24 | 24 | 24 |
| Calcium Carbonate | 90 | 90 | 90 |
| Carbon Black | 0.5 | 0.5 | 0.5 |
| Silane Adhesion Promoter | 5.3 | 5.3 | 5.3 |

The peel strength (pli/% CF) of the sealants on AMS substrates was determined under dry conditions, following immersion in JRF for 7 days, and following immersion in a solution of 3% NaCl according to AMS 3265 are presented in Table 6.

TABLE 6

Peel Strength of Sealants Formed Using Base 2 and Accelerators 1, 2, and 3.

| Base/Accelerator | Dry (pli/% CF) | JRF (7 days) (pli/% CF) | 3% NaCl (pli/% CF) |
|---|---|---|---|
| 2/1 | 23/100% CF | 8/100% CF | 9/100% CF |
| 2/2 | 31/screen failure | 17/100% CF | 13/100% CF |
| 2/3 | 31/100% CF | 20/100% CF | 16/screen failure |

Other embodiments of the present disclosure will be apparent to those skilled in the art from consideration of the specification and practice of the present disclosure. It is intended that the specification and examples be considered as exemplary only, with a true scope and spirit of the present disclosure being indicated by the following claims.

What is claimed is:

1. A curable composition comprising:
   a polythioether; and
   a polybasic acid-based polyepoxy, wherein the polythioether is formed by the process of:
   reacting a first polythiol with a compound comprising one epoxy group and a second group, other than an epoxy group, which is reactive with a thiol group to form a first prepolymer, wherein the polythiol preferentially reacts with the second group;
   reacting the first prepolymer and a second polythiol with the epoxy group to form a second prepolymer; and reacting the second prepolymer and a third polythiol with a polyvinyl ether and a polyfunctionalizing agent.

2. The curable composition of claim 1, wherein the polybasic acid-based polyepoxy is chosen from a dimer acid-based polyepoxy.

3. The curable composition of claim 2, wherein the dimer acid-based polyepoxy is chosen from a dimer acid-based diepoxide.

4. The curable composition of claim 2, wherein the dimer acid-based polyepoxy is derived from a $C_{10-60}$ fatty acid monomer.

5. The curable composition of claim 1, wherein the second and third polythiol comprise un-reacted first polythiol.

6. The curable composition of claim 1, wherein the first polythiol, second polythiol, and third polythiol are the same polythiols.

7. The curable composition of claim 1, wherein when cured, the curable composition exhibits a peel strength of at least 20 pounds per linear inch as determined according to AMS 3265.

8. A curable composition comprising
a) a polythioether; and
b) a polybasic acid-based polyepoxy; wherein the polythioether is chosen from a compound of Formula 3:

$$B\!-\!\{\!-\!S\text{-}A\text{-}[-\!(CH_2)_2\!-\!R^2\!-\!(CH_2)_2\!-\!S\text{-}A\!-\!-\!_n\!-\!]_n\!-\!R_6\}_z \quad 3$$

wherein
z is an integer from 3 to 6;
B is a z-valent group;
A is chosen from a segment chosen from Formula 2(a) and Formula 2(b)

$$-\!R^1\!-\!S\!-\!R^4\!-\!R^5\!-\!\overset{OH}{\underset{|}{C}}H\!-\!CH_2\!-\!S\!-\!R^1\!- \quad 2(a)$$

$$-\!R^1\!-\!, \quad 2(b)$$

wherein
each $R^1$ is independently chosen from $C_{2-6}$ n-alkylene, $C_{3-6}$ branched alkylene, $C_{6-8}$ cycloalkylene, $C_{6-10}$ alkylcycloalkylene, $-\{-(CH_2)_p-X-\}_q-(CH_2)_r-$, and $-[-(CH_2)_p-X-]_q-CH_2)_r-$ in which at least one $-CH_2$-group is substituted with at least one methyl group;

wherein
each X is independently chosen from O, S, —NH—, and —$NR^3$—, wherein each $R^3$ is chosen from hydrogen and —$CH_3$,
p is an integer from 2 to 6;
q is an integer from 1 to 5; and
r is an integer from 2 to 10;
each $R^2$ is independently chosen from O, $C_{2-6}$ alkyleneoxy, and $C_{5-12}$ cycloalkyleneoxy;
each $R^4$ is independently chosen from —$CH_2$—$CH_2$— and olefins conjugated with an electron attracting group;
each $R^5$ is independently chosen from $C_{2-10}$ alkylene, and $C_{2-10}$ alkyleneoxy,
each $R^6$ is independently chosen from a thiol group, a hydroxyl group, an amine group, and a vinyl group; and
n is an integer chosen to yield a number average molecular weight for the polythioether polymer ranging from 500 to 20,000 Daltons;
wherein the weight ratio of the segment of Formula 2(a) to the segment of Formula 2(b) ranges from 2:1 to 3:1.

9. The curable composition of claim 8, wherein the polythioether comprises more than one polythioether wherein the average functionality ranges from 2.05 to 3.

10. A method of making a curable composition comprising:
preparing a first component comprising a polythioether polymer;
preparing a second component comprising a polybasic acid-based polyepoxy; and
combining the first and second components to form the curable wherein the polythioether is formed by the process of:
reacting a first polythiol with a compound comprising one epoxy group and a second group, other than an epoxy group, which is reactive with a thiol group to form a first prepolymer, wherein the polythiol preferentially reacts with the second group;
reacting the first prepolymer and a second polythiol with the epoxy group to form a second prepolymer; and
reacting the second prepolymer and a third polythiol with a polyvinyl ether and a polyfunctionalizing agent.

11. A seal comprising a surface, and the curable composition of claim 1 applied to the surface.

* * * * *

UNITED STATES PATENT AND TRADEMARK OFFICE
CERTIFICATE OF CORRECTION

PATENT NO. : 7,390,859 B2  Page 1 of 1
APPLICATION NO. : 11/053102
DATED : June 24, 2008
INVENTOR(S) : Suresh G. Sawant, Chandra B. Rao and David R. Leon It is certified that error appears in the above-identified patent and that said Letters Patent is hereby corrected as shown below:

Column 21, Lines 25-26: $A\text{-}_n\text{-}]_n\text{-}R_6\}_z$ should read: -- $A\text{-}]_n\text{-}R_6\}_z$ --

Column 21, Line 44: -{- should be changed to: -- -[- --

Column 21, Line 26: $R_6$ should read: -- $R^6$ --

Signed and Sealed this

Sixth Day of January, 2009

JON W. DUDAS
*Director of the United States Patent and Trademark Office*